(No Model.) 4 Sheets—Sheet 2.

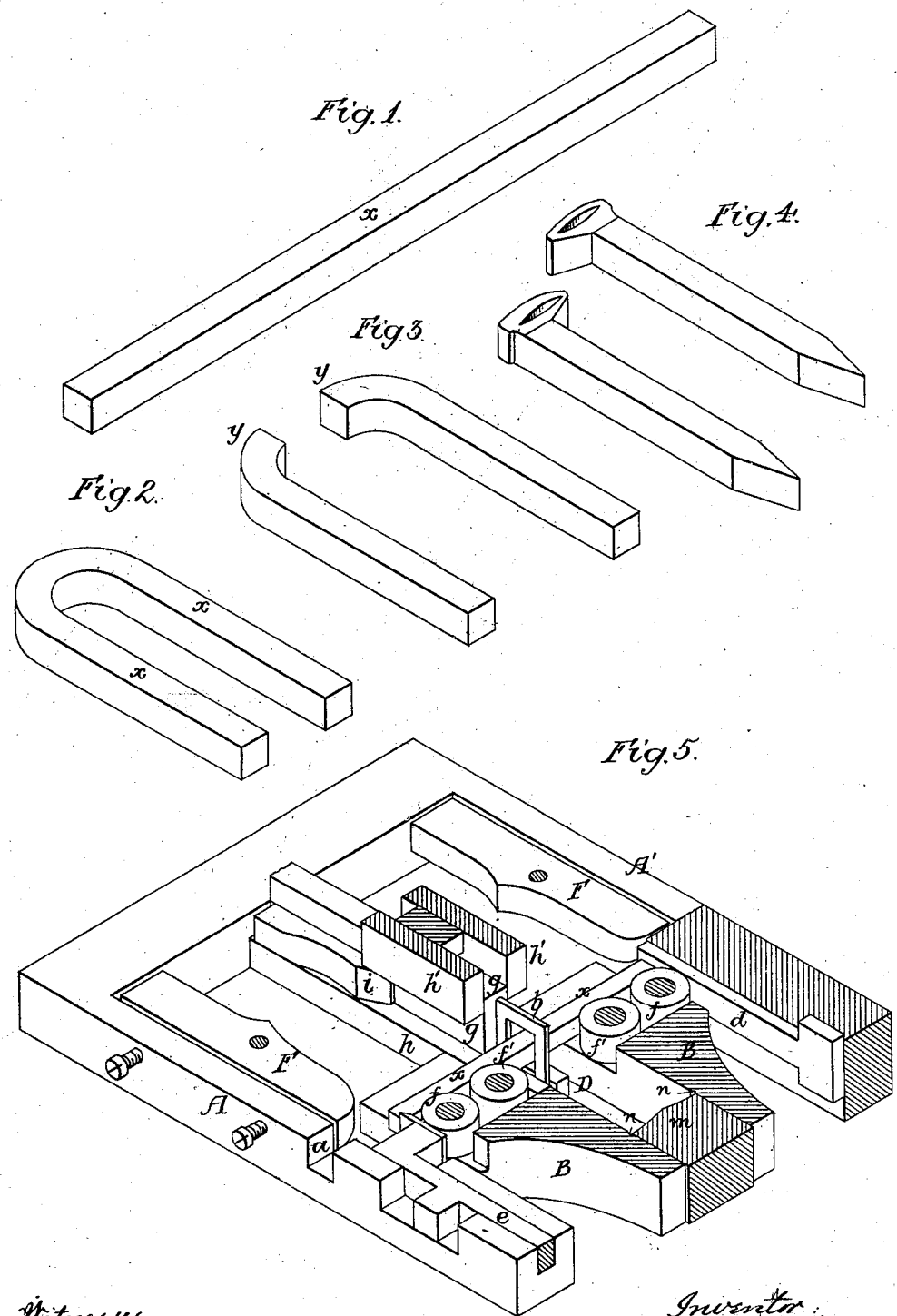

J. M. BAKER.
MACHINE FOR MAKING SPIKES.

No. 264,604. Patented Sept. 19, 1882.

Witnesses:
Harry Drury
Hamilton Turner

Inventor:
John M. Baker
by his attorneys
Howson and Son (No Model.) 4 Sheets—Sheet 3.

J. M. BAKER.
MACHINE FOR MAKING SPIKES.

No. 264,604. Patented Sept. 19, 1882.

Witnesses:
Harry Drury
Hamilton Turner

Inventor:
John M. Baker
By his attorneys
Howson and Son (No Model.) 4 Sheets—Sheet 4.

J. M. BAKER.
MACHINE FOR MAKING SPIKES.

No. 264,604. Patented Sept. 19, 1882.

Witnesses:
Harry Drury
Hamilton Turner

Inventor:
John M. Baker
by his Attorneys
Howson and Sons

UNITED STATES PATENT OFFICE.

JOHN M. BAKER, OF ALLENTOWN, PENNSYLVANIA.

MACHINE FOR MAKING SPIKES.

SPECIFICATION forming part of Letters Patent No. 264,604, dated September 19, 1882.

Application filed May 1, 1882. (No model.)

*To all whom it may concern:*

Be it known that I, JOHN M. BAKER, a citizen of the United States, and a resident of Allentown, Lehigh county, Pennsylvania, have invented certain Improvements in Spike-Manufacture and in Machinery therefor, of which the following is a specification.

One object of my invention is to effect the rapid production from bars of iron of spikes with perfectly-shaped heads and points, a further object being to construct a simple machine for carrying out the process. These objects I attain in the manner which I will now proceed to describe, reference being had to the accompanying drawings, in which—

Figure 8:
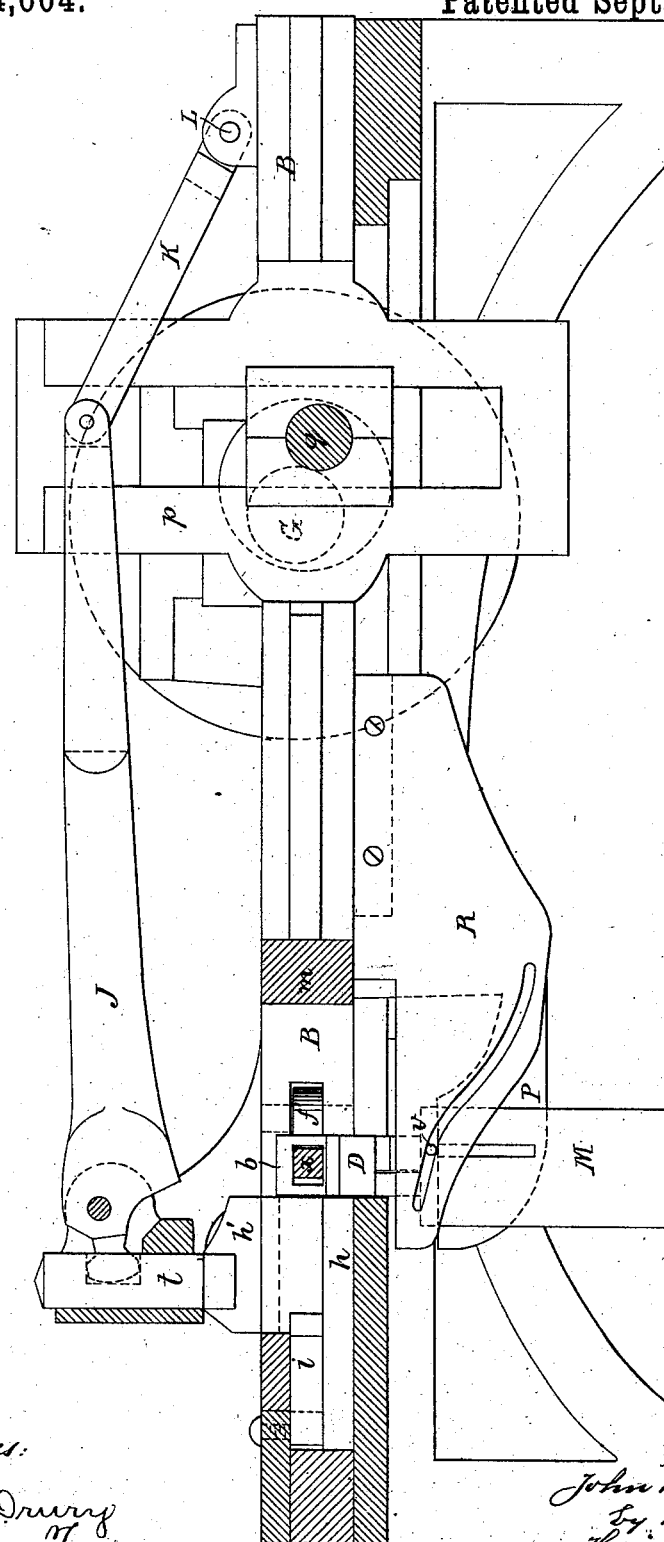
Figure 9:
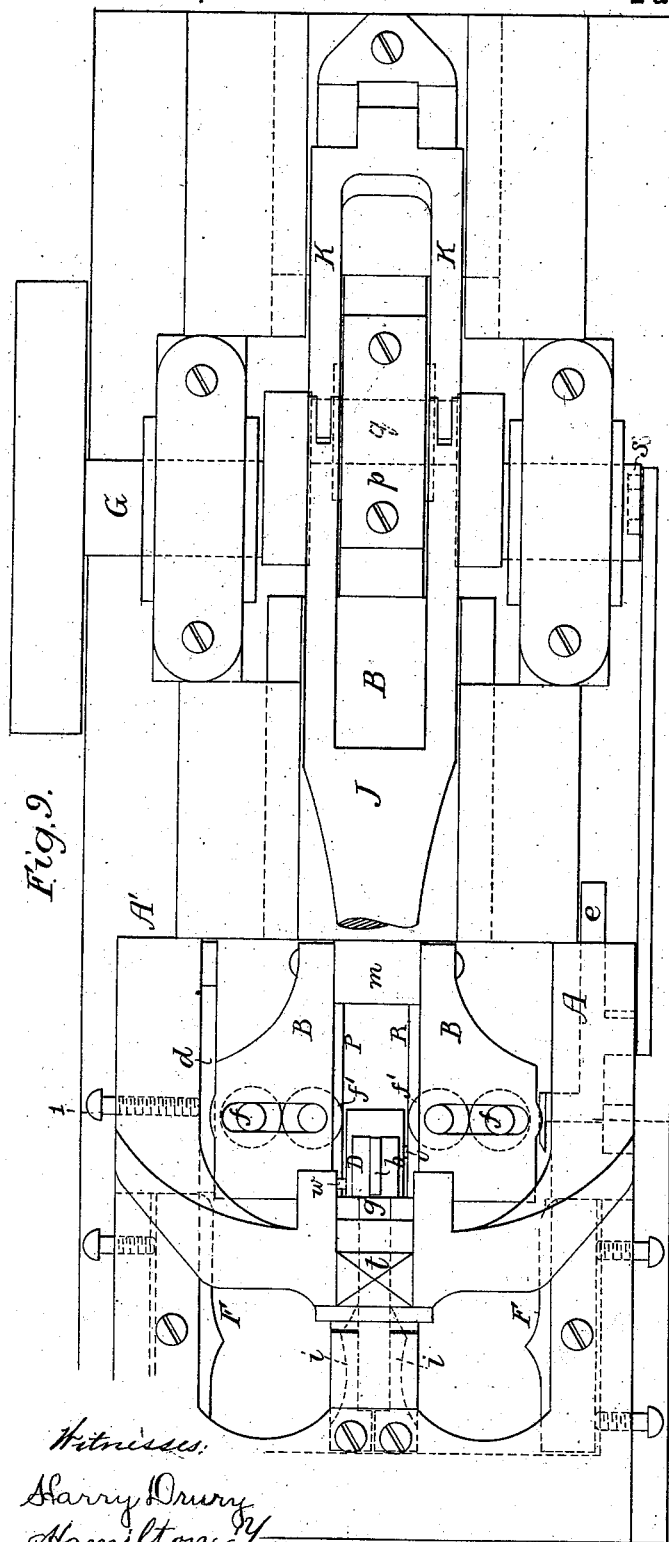
Figure 11:
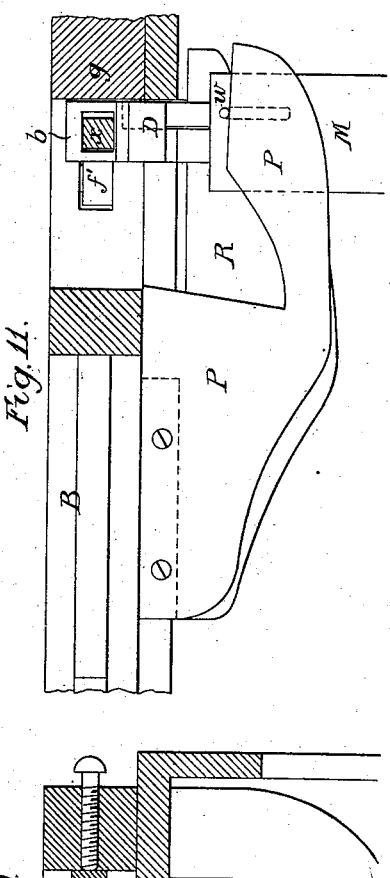
Figure 10:
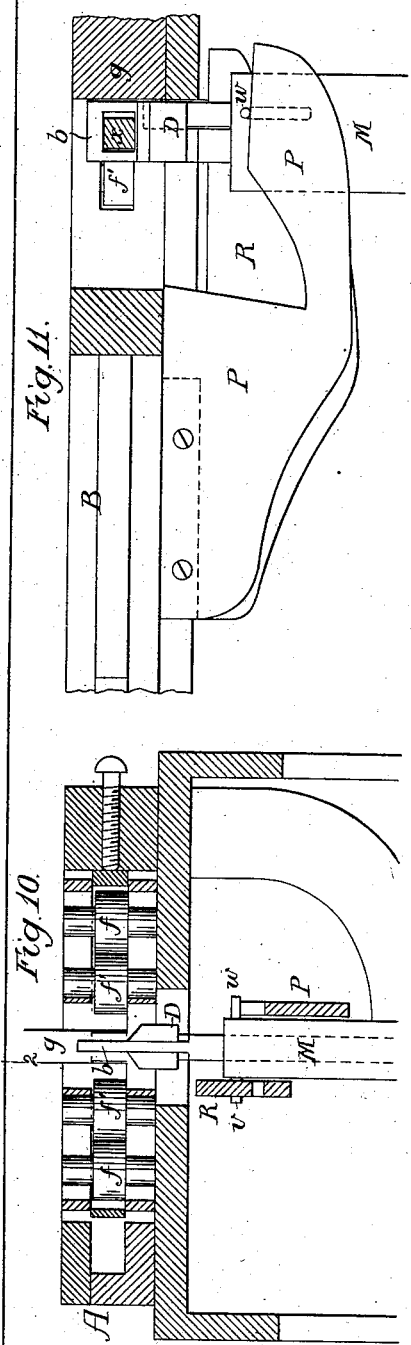

Figures 1, 2, 3, and 4, Sheet 1, are views illustrating the successive steps in the manufacture of spikes according to my invention; Fig. 5, Sheet 1, and Figs. 6 and 7, Sheet 2, perspective diagrams of those parts of the machine which act upon the bar to produce the spikes; Fig. 8, Sheet 3, a longitudinal section of the complete machine; Fig. 9, Sheet 4, a plan view; Fig. 10, a transverse section on the line 1 2, Fig. 9; and Fig. 11, a longitudinal section of part of the machine, looking in the opposite direction from Fig. 8.

The successive steps in the formation of spikes according to my invention will be understood on reference to Figs. 1, 2, 3, and 4, these steps being as follows: A piece, $x$, Fig. 1, of the proper length, having been cut from a bar, is bent in the center, as shown in Fig. 2, and the bent bar is then severed at the bend, so as to form two spike-blanks, each with a hooked end, $y$, as shown in Fig. 3, the spikes being completed by pressing the hooked ends of the blanks to form the heads, and rolling or pressing the opposite ends of the blanks to form the points, as shown in Fig. 4.

Figure 6:
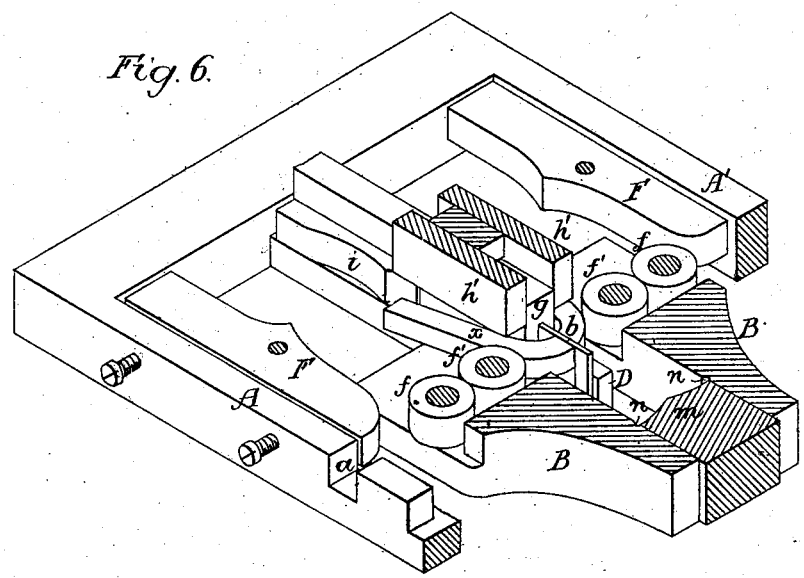

The operations resorted to in making the spikes, as above described, are as follows, and will be understood on reference to Figs. 5, 6, and 7.

The end of a bar of iron of the proper form and dimensions in cross-section is passed through an opening, $a$, in one of the side frames, A, of the machine, and through an opening in a knife, $b$, occupying a central position between the frames A A', the front end of the bar resting against a gage-plate, $d$, on the frame A'. A cutter-bar, $e$, which slides in guides in the frame A, then advances, and the bar of iron being held by the knife $b$ and frame A, the cutter severs from the bar the portion $x$, which is now supported vertically by the forked end of a sliding frame, B, and by the upper end of a sliding bar, D, the latter occupying a position in the forked end of a frame, B, and having a central slot for the reception and guidance of the knife $b$. (See Fig. 5.) The frame B now advances, and those portions of the bar $x$ which project on the opposite sides of the knife $b$ are acted upon by two pairs of rollers, $f f'$, carried by the frame B, the effect of this action being to bend the bar around a central block, $g$, immediately in advance of the knife $b$. As soon as the block is so bent the knife $b$ descends and severs the bar $x$ at the bend, as shown in Fig. 6, the upper end of the bar D supporting the bar $x$ at points close to the knife on each side during the cutting operation. As soon as the bar $x$ is cut the supporting-bar descends with the knife, so as to be out of the way during the subsequent operations. As the frame B continues to advance the blanks produced by severing the bent bar are clamped between the fixed and movable gripping-dies $h$ $h'$, and the outer roller, $f$, of each pair of rollers on the frame is acted upon by a cam, F, the said rollers $f$ being thus caused to press upon the inner rollers, $f'$, and the latter upon the blanks held between the gripping dies.

The final effect of the forward movement of the frame B is the pointing and heading of the spikes. The pointing operation is effected by the combined action of dies $i$ and the cams F, the latter acting through the medium of the rollers $f f'$ and imparting the taper to one side of each spike-blank, while the dies $i$ impart taper to the opposite sides of the same, as shown in Fig. 7. The frame B is slotted for the reception of the journals of the rolls $f f'$, so as to permit the necessary lateral movement of the latter.

Figure 7:
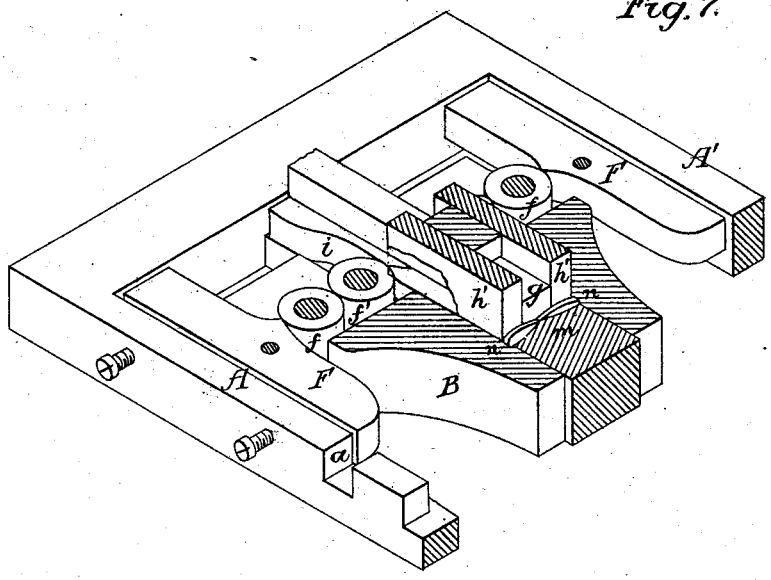

The heading is effected between the front end of the block $g$ and a heading-die, $m$, carried by the forked frame B, as shown in Fig. 7, portions of the heads being forced into recesses $n$ in the frame, so that upon the rearward movement of the said frame the spikes will be caused to move with it until their ends are clear of the gripping-dies, when they fall into a suitable receptacle beneath the machine.

It should be understood that before the retraction of the frame B the gripping-dies $h'$ are raised so as to release the spikes, and as the frame moves rearward the knife $b$ and bar D are raised so as to be in position to receive and support a fresh bar, $x$, prior to a repetition of the above-described operations.

The mechanism whereby the above-described parts are operated is shown in Figs. 8 to 11, inclusive, Sheets 3 and 4, and is as follows:

The frame B is suitably guided in the main frame of the machine, and has a slotted crosshead, $p$, to which is adapted a slide on the crank-pin $q$ of a crank on the main shaft G of the machine, the latter turning in bearings on the side frames, and having a cam, $s$, for operating the sliding cutter-bar $e$, whereby the bar $x$ is severed from the main bar.

The clamping-dies $h'$ are carried by a rod, $t$, which slides vertically in a bearing on the frame, and is operated by a lever, J, the short arm of which is adapted to an opening in the rod, the long arm of the lever being forked to accommodate the cross-head $p$, and being connected by links K to a pin, L, on the sliding frame B, so that as the latter reciprocates a vibrating movement will be imparted to the lever.

The supporting-bar D is guided in a standard, M, on the under side of the machine, and has the necessary vertical movement imparted to it by a cam-plate, P, carried by the sliding frame B, said cam-plate acting on a pin, $w$, projecting from the bar D through a slot in the standard M, the cam-plate being so formed as to afford a proper support for the bar during the cutting action of the knife $b$. (See Fig. 11.)

The knife $b$ is actuated by a cam-plate, R, also carried by the frame B, a pin, $v$, on the knife-shank projecting through a slot in the standard M, and being adapted to a cam-slot in the plate R, as shown in Fig. 8.

The gage-plate $d$ and the cutter on the bar $e$ are adjustable laterally, so as to vary the length of the cut bar $x$ in accordance with the character of the spike desired, and the dies $i$ and $m$ and cams F are adjustable and detachable, so that heads or points of different shapes can be formed upon the spikes.

Fixed dies may take the place of the gripping-dies $h'$, if desired; but the latter are preferred.

In place of two rollers, $f f'$, on each side of the frame B, slides, each carrying a roller at its inner end, may be used, the outer ends of the slides being under the influence of the cams F as the frame B moves forward.

By the above-described machine I am enabled to produce with rapidity spikes having pressed heads and rolled points, two spikes being made on each reciprocation of the frame B, and the machine being simple in construction and easy to keep in order, owing to the fewness of its parts, and the absence of the usual cams for operating gripping, pointing, and heading dies.

I claim as my invention—

1. The mode described of making spikes, said mode consisting in first bending a bar in the center, severing said bar at the bend to form two spike-blanks, pressing the bent end of each blank to form a head, and reducing the opposite ends of the blanks to form points, as set forth.

2. The combination, in a spike machine, of a gage-plate, $d$, a cutter-bar, $e$, and a knife, $b$, midway between the two, as specified.

3. The combination of the knife $b$ with the slotted supporting-block D, as set forth.

4. The combination of the knife $b$, the block $g$, and the forked and sliding frame B, adapted to bend a bar around said block $g$, as specified.

5. The combination of the knife $b$, the block $g$, the forked and sliding frame B, and the gripping-dies $h h'$, as set forth.

6. The combination of the block $g$, the pointing-dies $i$, and the cams F, with the sliding frame B, and the rollers $f f'$, carried thereby and capable of sliding laterally therein under the influence of the cams F, as set forth.

7. The combination of the guided knife $b$, the sliding frame B, and the cam-plate R, carried by said frame, as set forth.

8. The combination of the guided supporting-bar D with the sliding frame B and its cam-plate P, as set forth.

9. The combination of the knife $b$, the block $g$, and the sliding frame B, having a heading-die, $m$, as set forth.

10. The combination of the knife $b$, the block $g$, and the sliding frame B, having a heading-die, $m$, and recesses $n$, as specified.

11. The combination, in a spike-machine, of the following elements, namely: a block or former around which a bar is bent, a sliding frame, B, for bending the bar, a knife for severing the bar at the bend, gripping-dies $h h'$, pointing-dies $i$, a heading-die carried by the frame B, cams F, and mechanism whereby said cams are caused to act in conjunction with the dies $i$ to effect the pointing of the spikes, as set forth.

In testimony whereof I have signed my name to this specification in the presence of two subscribing witnesses.

JOHN M. BAKER.

Witnesses:
HARRY DRURY,
HARRY SMITH.